United States Patent
Senger Elsbernd

(12) 
(10) Patent No.: US 6,235,701 B1
(45) Date of Patent: May 22, 2001

(54) STABILIZED CARBON DIOXIDE FLUID COMPOSITION AND USE THEREOF

(75) Inventor: Cheryl L. Senger Elsbernd, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/299,402

(22) Filed: Apr. 26, 1999

(30) Foreign Application Priority Data

Dec. 11, 1998 (CA) ................................................ 2255413

(51) Int. Cl.$^7$ ..................................................... C11D 7/28
(52) U.S. Cl. ......................... 510/412; 510/285; 510/286; 510/506; 252/373
(58) Field of Search .................................. 510/285, 286, 510/412, 506; 252/373

(56) References Cited

U.S. PATENT DOCUMENTS

| | | | |
|---|---|---|---|
| 2,803,656 | 8/1957 | Ahlbrecht et al. | 260/556 |
| 3,734,962 | 5/1973 | Niederprum et al. | 260/556 |
| 3,765,488 | 10/1973 | Pence, Jr. | 166/308 |
| 3,954,626 | 5/1976 | Greminger, Jr. et al. | 252/8.55 |
| 4,203,299 | 5/1980 | Dinglinger | 62/49 |
| 4,299,286 | 11/1981 | Alston | 166/274 |
| 4,374,545 | 2/1983 | Bullen et al. | 166/280 |
| 4,519,455 | 5/1985 | Holtmyer et al. | 166/305 |
| 4,561,452 | 12/1985 | Gahrs | 131/297 |
| 4,627,495 | 12/1986 | Harris et al. | 166/280 |
| 4,706,752 | 11/1987 | Holm | 166/273 |
| 4,714,617 | 12/1987 | Gahrs | 426/427 |
| 4,906,792 | 3/1990 | Heilmann et al. | 568/812 |
| 5,069,282 | 12/1991 | Taylor | 166/301 |
| 5,403,575 | 4/1995 | Kaufman et al. | 424/1.89 |
| 5,515,920 | 5/1996 | Luk et al. | 166/280 |
| 5,558,160 | 9/1996 | Tudor | 166/280 |
| 5,658,962 | 8/1997 | Moore et al. | 521/114 |
| 5,733,964 | 3/1998 | Johnston et al. | 524/505 |
| 5,750,797 | 5/1998 | Vitcak et al. | 568/683 |
| 5,759,209 | 6/1998 | Adler et al. | 8/142 |
| 5,780,565 | 7/1998 | Clough et al. | 526/206 |
| 5,785,950 | 7/1998 | Kaufman et al. | 424/1.89 |
| 5,962,390 | 10/1999 | Flynn et al. | 510/286 |
| 6,051,421 | * 4/2000 | Sauer et al. | 435/283.1 |

FOREIGN PATENT DOCUMENTS

| | | |
|---|---|---|
| 1294949 | 5/1969 | (DE) . |
| 2287432 | 5/1976 | (FR) . |
| 2754464 | 4/1998 | (FR) . |
| 2771408 | 5/1999 | (FR) . |
| 6-293686 | 10/1994 | (JP) . |
| 8-041494 * | 2/1996 | (JP) . |
| 10-018176 | 1/1998 | (JP) . |
| WO 93/15794 * | 8/1993 | (WO) . |
| WO 96/27704 | 9/1996 | (WO) . |
| WO 97/16264 | 5/1997 | (WO) . |
| WO 97/28229 | 8/1997 | (WO) . |
| WO 98/59105 | 12/1998 | (WO) . |

OTHER PUBLICATIONS

Adcock, "Replacement of Hydrogen by Fluorine", *Chemistry of Organic Fluorine Compounds II*, ACS Monograph 187, American Chemical Society, Washington D.C., 1995, pp. 97–119, Sep. 1995.

Arai et al, "The Experimental Determination of the P–V–T–X Relations for the Carbon Dioxide–Nitrogen and the Carbon Dioxide–Methane Systems", *Journal of Chemical Engineering of Japan*, vol. 4, No. 2, May 1971, pp. 113–122.

Blauer et al., "Rheological and Physical Differences Between Foam and Emulsion Fracturing Fluids", SPE Annual Technical Conference & Exhibition, Oct. 2–5, 1988, pp. 349–359.

Gupta et al., "The History and Success of Liquid $CO_2$ and $CO_2/N_2$ Fracturing System", *Society of Petroleum Engineers*, SPE 40016, 1998, 1–8, Mar. 1998.

Hacura et al., "Interaction Induced Light Scattering (IILS) From the $v_2$ Mode of $CO_2$ In $CO_2$–$N_2$ Supercritical Mixtures", Proceedings of the International Conference on Lasers '87, Dec. 7–11, 1987, pp. 931–935.

Harris, "A Comparison of Mixed–Gas Foams with $N_2$ and $CO_2$ Foam Fracturing Fluids on a Flow–Loop Viscometer", *SPE Production & Facilities*, Aug. 1995, pp. 197–199, 202–203.

Jiang et al., "Determination of Compressibility Factors and Viral Coefficients for the Systems Containing $N_2$, $CO_2$ and $CHC1F_2$ by the Modified Burnett Method", *Fluid Phase Equilibria*, 57, 1990, pp. 105–117.

McHugh et al., "Supercritical Fluid Extraction", Butterworth–Heinemann, N.Y., 1994, Table of Contents, No Month Given.

Niederprum et al., "Hydroxyalkylierung von Perfluoralkansulfonamiden", *Liebigs Ann. Chem.*, 1973, pp. 11–19, No Month Given.

Ree, "Supercritical Fluid Phase Separations: Implications for Detonation Properties of Condensed Explosives", *J. Chem Phys.* 84 (10), May 15, 1986, pp. 5845–5856.

Supercritical Fluids, *Encyclopedia of Chemical Technology*, 4$^{th}$ Ed., John Wiley & Sons, N.Y., vol. 23, pp. 452–475, No Date Given.

Kirk–Othmer Encyclopedia of Chemical Technology, 4$^{th}$ Ed., vol. 23, (1997) p. 462, Oct. 9, 1997.

* cited by examiner

Primary Examiner—Yogendra Gupta
Assistant Examiner—Brian P. Mruk
(74) Attorney, Agent, or Firm—Kent S. Kokko

(57) ABSTRACT

A stable fluid comprising compressed fluid carbon dioxide, an inert gas and a fluorochemical stabilizer is disclosed. The fluid composition is useful in cleaning of metals, glass, ceramics, natural and synthetic polymers, and fabrics and in the extraction of desirables substances, such as the extraction of essential oils from plants.

35 Claims, No Drawings

STABILIZED CARBON DIOXIDE FLUID COMPOSITION AND USE THEREOF

This invention relates to a novel fluid composition. In particular, this invention relates to a fluid composition comprising compressed fluid carbon dioxide, an inert gas, and a fluorochemical stabilizer.

This application claims priority from foreign application No. CA 2,255,413, filed on Dec. 11, 1998.

BACKGROUND OF THE INVENTION

U.S. Pat No. 5,780,565 (Clough et al.) describe mixtures of liquid or supercritical $CO_2$ and either perfluorocarbons or hydrofluorocarbons as a polymerization media in which the polymers produced are insoluble in the media.

U.S. Pat. No. 5,515,920 (Luk et al.) describes the use of a mixture of a liquified gas, such as $CO_2$, and particulate proppants as a fracturing fluid for stimulating the production of crude oil and natural gas from wells in reservoirs of low permeability.

Published patent application WO 96/27704 described a system for dry cleaning comprising "densified" $CO_2$ and a surfactant. The surfactant comprising "$CO_2$-philic" and "$CO_2$-phobic" moieties. Published patent application WO 97/16264 describes a system for dry cleaning comprising fluid $CO_2$ and functional fluorinated compounds.

Mixtures of nitrogen and carbon dioxide are known in the art. Arai et al. have reported the pressure, volume, temperature and compositional relationships for the binary system in *Journal of Chemical Engineering of Japan*, volume 4, no. 2, 1971, pp. 113–122.

U.S. Pat No. 4561452 (Gährs) describes the use of compressed gaseous solvents comprising mixtures of carbon dioxide and nitrogen to extract nicotine from tobacco and U.S. Pat No. 4,714,617 (Gährs) describes the use of of compressed gaseous solvents comprising mixtures of carbon dioxide and nitrogen to extract caffeine from coffee.

However, even under high shear conditions, emulsions or foams of liquid $CO_2$ and nitrogen are generally not stable, and readily phase separate leading to fluid and/or gas losses as well as changes in the rheological properties of the fluid. Accordingly, it would be desirable to stabilize such compositions.

SUMMARY OF THE INVENTION

In one aspect, the present invention provides a fluid composition that comprises compressed fluid carbon dioxide, an inert gas dissolved or dispersed in the compressed fluid carbon dioxide and a liquid, nonionic fluorochemical stabilizer. Depending on the temperature and pressure at which the fluid composition is held, and the relative concentration of the components of the fluid composition, the fluid compositions of the invention may exist in two or more states. For example, the fluid composition may exist in a single liquid state in the form of a liquid-liquid emulsion, a liquid-liquid microemulsion, liquid-liquid dispersion or solution. It may exist in two states the form of a foam or a liquid-gas dispersion. The fluid composition is surprisingly stable, and does not generally phase separate even over periods of several weeks, even in the absence of a shear force.

The fluid composition of the present invention may be used in numerous applications including, for example,; an extraction process for the isolation and recovery of a desirable component from a substrate, such as the extraction of essential oils from plant tissues; a cleaning process for removal of soils, as in a dry cleaning process; and as a reaction medium used in, for example, polymerization processes. The stable fluid composition provides the advantage that both the carbon dioxide and inert gas are non-toxic and non-polluting. This can eliminate VOCs and hazardous organic solvents from many applications, including cleaning and extracting. Also, the stable fluid composition presents disposal advantages by vaporization of the fluid composition upon release of pressure and leaves little residue.

In another aspect of this invention, a process for extraction is provided in which a substrate containing an extractable component is contacted with the fluid composition of the invention to remove the extractable component from the substrate. Subsequently the extractable component may be separated from the fluid composition and the fluid composition may be recycled. The process may be used to extract essential oils from plants, caffeine from coffee beans, and nicotine from tobacco.

In another aspect of this invention, a process for cleaning is provided in which a substrate containing a contaminant is contacted with the fluid composition of the invention to remove the contaminant from the substrate. Subsequently the fluid composition containing the contaminant is separated form the substrate, the contaminant may be separated from the fluid composition and the fluid composition may be recycled. The cleaning process may be used in many industrial and consumer cleaning operations such as industrial degreasing or dewatering operations, or the dry cleaning of garments and textiles.

DETAILED DESCRIPTION

As used herein "stable" with regard to foams, dispersions and emulsions means the physical and functional properties of the fluid remain substantially unchanged for a period of time sufficient to permit the desired end use.

As used herein "fluid" refers to solutions, dispersions, emulsions, foams and microemulsions. It is often difficult to characterize the exact physical state of a fluid while under pressure. Solutions and microemulsions both appear to be homogeneous and clear, since the droplet or particle size of a microemulsion is too small to scatter light. Emulsions and foams of fluids under pressure are often indistinguishable because they may not exhibit changes in Theological properties when converting from an emulsion to a foam (see for example Blauer, et al. (Society of Petroleum Engineers, SPE paper 18214, 1988). Blauer et al. note that the fluid is in a foam state if the temperature is greater than the bubble point of the discontinuous phase, and in an emulsion state if less. However, if the average fluid pressure is greater than the critical pressure of the discontinuous phase, there is no obvious change from liquid to gas.

As used herein the term "compressed fluid", with reference to carbon dioxide, means a supercritical fluid, a near-critical fluid, an expanded liquid or a highly compressed gas, depending on the temperature, pressure and composition. See, for example, *Supercritical Fluids*, Encyclopedia of Chemical Technology, 4th Edition, John Wiley and Sons, N.Y, vol. 23, pp. 453.

The compressed fluid carbon dioxide may be present in the supercritical, compressed gas, near-critical fluid, expanded liquid or liquid states and may be used to prepare the compositions of this invention. If liquid $CO_2$ is used in the compositions or processes of this invention, the temperature is preferably below about 31° C. If compressed gaseous $CO_2$ is used, the pressure is preferably from about 20 to 75 bar (2 to 7.6 MPa). The $CO_2$ may also be used in the supercritical state, i.e. at or above that temperature at which $CO_2$ cannot be liquefied by further increases in pressure. The thermodynamic properties of $CO_2$ are described, for example, in McHugh and Krukonis, *Supercritical Fluid Extraction*, Butterworth-Heinemann, N.Y., 1994. The physical state of compressed fluid $CO_2$ depends on the desired end use for the composition (cleaning or extraction, for example) and the operating temperatures and pressures at which the desired end use is typically accomplished.

The inert gas may be any compound or element that is gaseous at standard temperature and pressure, cannot be transformed to a liquid or supercritical fluid at the temperature and pressure of the compressed fluid $CO_2$ and is non-reactive under the conditions of use. By non-reactive it is meant the gas is not appreciably reactive toward the containers, equipment, substrates or environment of the fluid. Such inert gases include, for example, nitrogen, helium, argon, krypton and xenon. In many applications, other gases, not normally considered inert, may be used if, at the temperature and pressure of use of the fluid composition, the gas is non-reactive. These gases may include, for example, methane, ethane, natural gas as well as other gases that are non-reactive under conditions of use.

More specifically, the inert gas used in the fluid composition should be non-reactive toward any metals, glass of the containers or equipment used in storing, conveying or processing of the fluid composition. It should be non-reactive toward any substrates contacted by the fluid composition, such as fabrics, metals or glass when used in a cleaning process, biological materials such as plant tissue when used in an extraction process, or toward rock and mineral formation when used in a fracturing process for the recovery of oil. Further, it should be non-reactive to any liquids and gases to which it may be exposed during use of the fluid, such as atmospheric gases, water or oil.

The proportion of inert gas in the compressed fluid $CO_2$ may vary from about 1 to 75 weight %, depending on the desired end use of the fluid. At low concentration of inert gas the fluid appears as a solution (or microemulsion) and is characterized by a relatively low viscosity due to the inert gas. At higher concentrations, at a given temperature and pressure, the inert gas will produce foams or emulsions having much higher viscosity. The lower viscosity fluids are particularly useful in applications such as extraction and cleaning.

The fluorochemical stabilizer of the present invention comprises a nonionic, fluorinated hydrocarbon that may be linear, branched, or cyclic, and optionally may contain one or more additional catenary heteroatoms, such as nitrogen or oxygen. The stabilizer may be selected from the group consisting of fully- and partially-fluorinated alkanes, amines, ethers, and aromatic compounds. Preferably, the fluorochemical stabilizer is non-functional, i.e. lacking functional groups that are polymerizable, reactive toward acids, bases, oxidizing agents, reducing agents or nucleophiles. Preferably, the number of fluorine atoms exceeds the number of hydrogen atoms in the fluorochemical stabilizer. To be non-flammable, the relationship between the number of fluorine, hydrogen, and carbon atoms can preferably be related in that the number of fluorine atoms is equal to or exceeds the sum of the number of number of hydrogen atoms and carbon-carbon bonds:

F atoms ≧ (#H atoms + #C—C bonds).

One class of compounds useful as fluorochemical stabilizers comprises perfluorocarbons in which all carbon-bound hydrogen is replaced by fluorine atoms. Such compounds are known to be inert and exhibit high thermal stability. Such perfluorinated compounds may include perfluoroalkanes, perfluoroamines and, perfluoroethers, which may be linear or branched, and cyclic or acyclic. Examples of perfluorinated compounds include perfluoroalkanes having the general formula $C_nF_{2n+2}$, perfluoroethers and polyethers having the general formula $C_nF_{2n+2}O_m$ and perfluoroamines having the general formula $C_{nF2n+3}N$, where n is an integer of 3 to 20 and m is 1 to 5.

Useful perfluorinated liquids typically contain from 3 to 20 carbon atoms and may optionally contain one or more catenary heteroatoms, such as divalent oxygen or trivalent nitrogen atoms. The term "perfluorinated liquid" as used herein includes organic compounds in which all (or essentially all) of the hydrogen atoms are replaced with fluorine atoms. Representative perfluorinated liquids include cyclic and non-cyclic perfluoroalkanes, perfluoroamines, perfluoroethers, perfluorocycloamines, and any mixtures thereof Specific representative perfluorinated liquids include the following: perfluoropentane, perfluorohexane, perfluoroheptane, perfluorooctane, perfluoromethylcyclohexane, perfluorotributyl amine, perfluorotriamyl amine, perfluoro-N-methylmorpholine, perfluoro-N-ethylmorpholine, perfluoroisopropyl morpholine, perfluoro-N-methyl pyrrolidine, perfluoro-1,2-bis(trifluoromethyl)hexafluorocyclobutane, perfluoro-2-butyltetrahydrofuran, perfluorotriethylamine, perfluorodibutyl ether, and mixtures of these and other perfluorinated liquids.

Commercially available perfluorinated liquids that can be used in this invention include: FLUORINERT FC-43™-Electronic Fluid, FLUORINERT FC-72™ Electronic Fluid, FLUORINERT FC-77™ Electronic Fluid, FLUORINERT FC-84™ Electronic Fluid, FLUORINERT FC-87™ Electronic Fluid, Performance Fluid PF-5060™, Performance Fluid PF-5070™, and Performance Fluid PF-5052™. Some of these liquids are described in FLUORINERT™ Electronic Fluids, product bulletin 98-0211-6086(212)NPI, issued February 1991, available from 3M Co., St. Paul, Minn. Other commercially available perfluorinated liquids that are considered useful in the present invention include perfluorinated liquids sold as GALDEN™ LS fluids available from Montedison Inc., Italy, KRYTOX™ fluids available from DuPont and FLUTEC™ PP fluids available from BNFL Fluorochemicals Ltd.

Perfluorinated compounds are known and can be made by techniques such as direct fluorination, electrochemical fluorination, addition polymerization of fluorine-containing monomers and the oxidative polymerization of fluorine containing monomers. See, for example, *Chemistry of Organic Fluorine Compounds II*, M. Hudlicky and A. Pavlath, Eds., ACS Monograph 187, American Chemical Society, Washington, D.C., 1995, pp. 95–120.

It is preferred that the fluorochemical stabilizer contains aliphatic hydrogen atoms. Perfluorinated compounds, since they lack chlorine atoms, are not ozone-depleting agents, but these compounds may exhibit a global warming potential (GWP) due to their long atmospheric lifetimes. It is preferred that the fluorochemical stabilizer contains at least one aliphatic hydrogen atom in the molecule. These compounds generally are very thermally and chemically stable, yet are much more environmentally acceptable in that they degrade in the atmosphere and thus have a low global warming potential, in addition to a zero ozone depletion potential.

Partially fluorinated liquids, containing one or more aliphatic or aromatic hydrogen atoms, may be employed in the fluid compositions of the invention. Such liquids, like the above perfluorinated counterparts, typically contain from 3 to 20 carbon atoms and may optionally contain one or more catenary heteroatoms, such as divalent oxygen or trivalent nitrogen atoms. Useful partially fluorinated liquids include cyclic and non-cyclic fluorinated alkanes, amines, ethers, cycloamines, and any mixture of mixtures thereof. Preferably, the number of fluorine atoms exceeds the number of hydrogen atoms and more preferably the number of fluorine atoms is equal to or exceeds the sum of the number of combined hydrogen atoms and carbon-carbon bonds. Although not preferred, due to environmental concerns, the partially fluorinated liquids optionally may contain one or more chlorine atoms provided that where such chlorine atoms are present there are at least two hydrogen atoms on the geminal or adjacent carbon atom(s).

One class of partially fluorinated liquids useful as fluorochemical stabilizers are hydrofluorocarbons; i.e. compounds having only carbon, hydrogen and fluorine, and optionally catenary divalent oxygen and/or trivalent nitrogen. Such compounds are nonionic, may be linear or branched, cyclic or acyclic. Such compounds are of the formula $C_nF_mH_{2n+2-m}$, where n is from about 3 to 20 inclusive, m is at least one, and where one or more nonadjacent —$CF_2$— groups may be replaced with catenary oxygen or trivalent nitrogen atoms. Preferably the number of fluorine atoms is equal to or greater than the number of hydrogen atoms, and more preferably the number of fluorine atoms is equal to or exceeds the sum of the combined number of hydrogen atoms and carbon-carbon bonds of fluorine atoms.

Another useful class of partially fluorinated liquids includes fluoroalkyl-substituted aromatic compounds such as hexafluoroxylene.

A preferred class of hydrofluorocarbon liquids particularly useful to form the stable fluid composition of the invention comprises fluorinated ethers of the general formula:

$$(R_1-O)_n-R_2 \qquad (I)$$

where, in reference to Formula I, n is a number from 1 to 3 inclusive and $R_1$ and $R_2$ are the same or are different from one another and are selected from the group consisting of alkyl, aryl, and alkylaryl groups and their derivatives. At least one of $R_1$ and $R_2$ contains at least one fluorine atom, and at least one of $R_1$ and $R_2$ contains at least one hydrogen atom. $R_1$ and $R_2$ may also be linear, branched, cyclic or acyclic and optionally, one or both of $R_1$ and $R_2$ may contain one or more catenary heteroatoms, such as trivalent nitrogen or divalent oxygen. Preferably the number of fluorine atoms is equal to or greater than the number of hydrogen atoms, and more preferably more preferably the number of fluorine atoms is equal to or exceeds the sum of the number of combined number of hydrogen atoms and carbon-carbon bonds. Although not preferred, due to environmental concerns, $R_1$ or $R_2$ or both of them optionally may contain one or more chlorine atoms provided that where such chlorine atoms are present there are at least two hydrogen atoms on the $R_1$ or $R_2$ group on which they are present.

More preferably, the fluid compositions of the present invention are prepared with fluorinated ethers of the formula:

$$R_f-O-R \qquad (II)$$

where, in reference to Formula II above, $R_f$ and R are as defined for $R_1$ and $R_2$ of Formula I, except that $R_f$ contains at least one fluorine atom, and R contains no fluorine atoms. More preferably, R is an acyclic branched or straight chain alkyl group, such as methyl, ethyl, n-propyl, iso-propyl, n-butyl, i-butyl, or t-butyl, and $R_f$ is preferably a fluorinated derivative of a cyclic or acyclic, branched or straight chain alkyl group having from 3 to about 14 carbon atoms, such as n—$C_4F_9$—, i—$C_4F_9$—, i—$C_3F_7$, (n—$C_3F_7$)CF— or cyclo-$C_6F_{11}$—. $R_f$ may optionally contain one or more catenary heteroatoms, such as trivalent nitrogen or divalent oxygen atoms.

In a preferred embodiment, $R_1$ and $R_2$, or $R_f$ and R, are chosen so that the compound has at least three carbon atoms, and the total number of hydrogen atoms in the compound is at most equal to the number of fluorine atoms. In the most preferred embodiment, $R_1$ and $R_2$ or $R_f$ and R are chosen so that the compound has at least three carbon atoms, and more preferably number of fluorine atoms is equal to or exceeds the sum of the number of combined hydrogen atoms and carbon-carbon bonds.

Representative hydrofluoroether compounds described by Formulas I and II include the following:

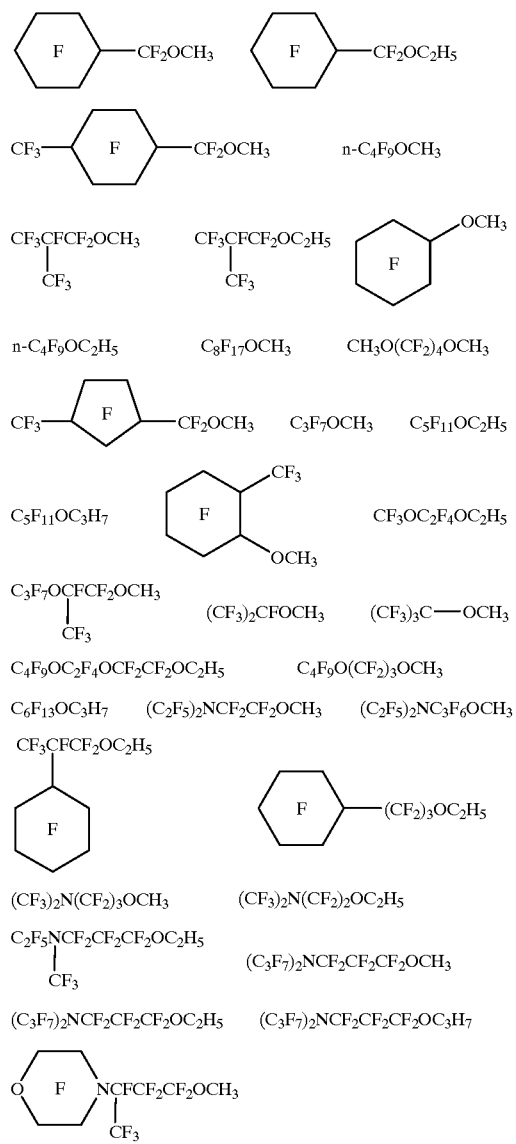

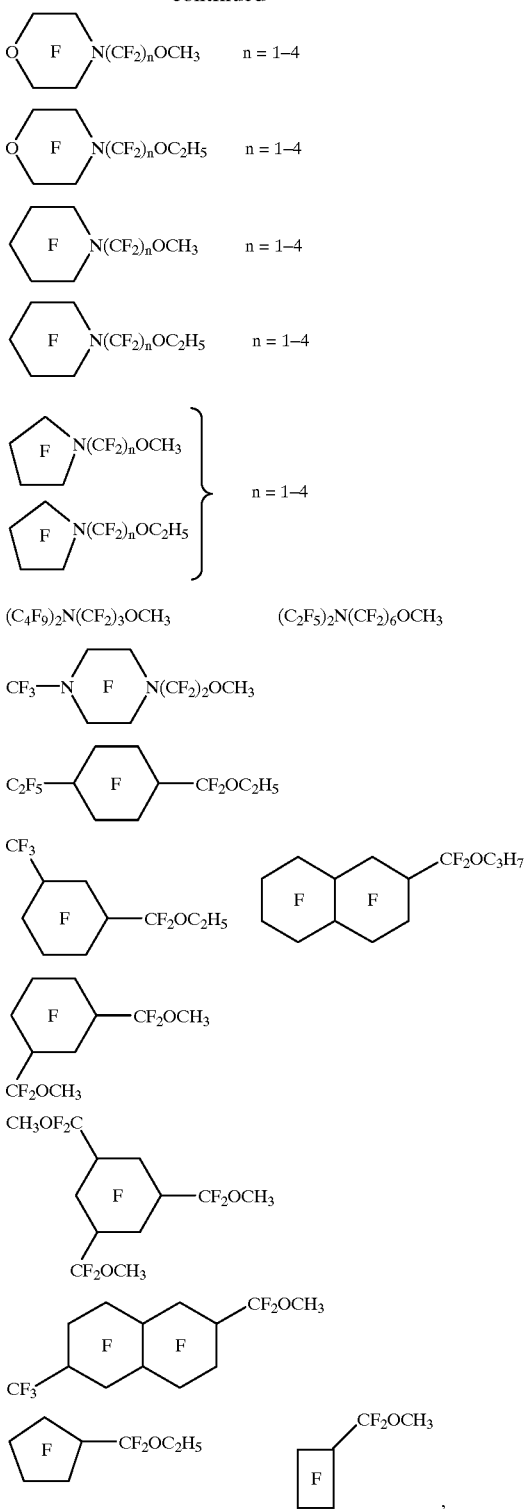

$C_3F_7CF(OC_2H_5)CF(CF_3)_2$
$C_2F_5CF(OC_2H_5)CF(CF_3)_2$
$C_2F_5CF(OCH_3)CF(CF_3)_2$
$CF_3CF(OCH_3)CF(CF_3)_2$ wherein cyclic structures designated with an interior "F" are perfluorinated.

Preferred segregated hydrofluoroethers include $C_3F_7OCH_3$, $(CF_3)_2CFOCH_3$, $C_4F_9OCH_3$, $(CF_3)_2CFCF_2OCH_3$, $(CF_3)_2CFCF_2OC_2H_5$, $(CF_3)_3COCH_3$, $CH_3O(CF_2)_4OCH_3$, and $CH_3O(CF_2)_6OCH_3$. $C_3F_7OC_2H_5$, $C_4F_9OC_2H_5$, $c-C_7F_{13}OCH_3$, $c-C_7F_{13}OC_2H_5$, $C_7F_{15}OCH_3$, $C_7F_{15}OC_2H_5$, $C_{10}F_{21}OCH_3$, and $C_{10}F_{21}OC_2H_5$. By "segregated" it is meant that hydrogen atom(s) and fluorine atom(s) are not found on adjacent carbon atoms. Blends of one or more fluorinated ethers are also considered useful in practice of the invention.

A number of synthetic routes to hydrofluoroethers are known. These methods may be broadly divided into two groups; methods of fluorinating an ether compound, and methods where the ether linkage is formed within a compound by reaction with a fluorine-containing precursor. The former methods include: (1) direct fluorination of an ether compound; and (2) electrochemical fluorination of an ether compound. The latter methods include: (3) the addition reaction of an alcohol to a fluorinated olefin; (4) alkylation of a partially fluorinated alcohol; and (5) non-catalytic alkylation of a fluorinated carbonyl compound with a suitable alkylating agent. Japanese Patent No. JP 6-293686 provides a partial summary description of these varied methods.

The fluorinated ethers (alkoxy-substituted perfluorocompounds) suitable for use in the process of the invention can be prepared by alkylation of perfluorinated alkoxides prepared by the reaction of the corresponding perfluorinated acyl fluoride or perfluorinated ketone with an anhydrous alkali metal fluoride (e.g., potassium fluoride or cesium fluoride) or anhydrous silver fluoride in an anhydrous polar, aprotic solvent. (See, e.g., the preparative methods described in French Patent Publication No. 2,287,432, German Patent Publication No. 1,294,949, and U.S. Pat. No. 5,750,797 (Flynn et al.). Alternatively, a fluorinated tertiary alcohol can be allowed to react with a base, e.g., potassium hydroxide or sodium hydride, to produce a perfluorinated tertiary alkoxide which can then be alkylated by reaction with alkylating agent.

Suitable alkylating agents for use in the preparation include dialkyl sulfates (e.g., dimethyl sulfate), alkyl halides (e.g., methyl iodide), alkyl p-toluenesulfonates (e.g., methyl p-toluenesulfonate), alkyl perfluoroalkanesulfonates (e.g., methyl perfluoromethanesulfonate), and the like. Suitable polar, aprotic solvents include acyclic ethers such as diethyl ether, ethylene glycol dimethyl ether, and diethylene glycol dimethyl ether; carboxylic acid esters such as methyl formate, ethyl formate, methyl acetate, diethyl carbonate, propylene carbonate, and ethylene carbonate; alkyl nitrites such as acetonitrile; alkyl amides such as N,N-dimethylformamide, N,N-diethylformamide, and N-methylpyrrolidone; alkyl sulfoxides such as dimethyl sulfoxide; alkyl sulfones such as dimethylsulfone, tetramethylene sulfone, and other sulfolanes; oxazolidones such as N-methyl-2-oxazolidone; and mixtures thereof.

As yet another alternative, the fluorinated ethers may be prepared by reacting a fluorinated carbonyl compound, such as a ketone or acid fluoride, with an alkylating agent in the presence of a Lewis acid catalyst as described in U.S. Ser. No. 09/042819 filed Mar. 17, 1998 (Lamanna et al.).

Other useful hydrofluoroethers are the omega-hydrofluoroalkyl ethers described in U.S. Pat. No. 5,658,962 (Moore et al.), herein incorporated by reference, which can be described by the general structure shown in Formula III:

$$X—R_f'—(O—R_f'')_y—O—R''—H \qquad \text{(Formula III)}$$

wherein:
X is either F or H;
$R_f'$ is a divalent perfluorinated organic radical having from 1 to about 12 carbon atoms;

$R_f$ is a divalent perfluorinated organic radical having from 1 to about 6 carbon atoms;

R" is a divalent organic radical having from 1 to 6 carbon atoms, and preferably, R" is perfluorinated; and y is an integer from 0 to 4.

Representative compounds described by Formula II which are suitable for use in the processes of the invention include the following compounds:

$C_8F_{17}OCF_2O(CF_2)_5H$ $C_3F_7O[C(CF_3)CF_2O]_pCFHCF_3$, wherein p = 0 to 5

$C_8F_{17}OC_2F_4OC_2F_4OC_2F_4OCF_2H$ $C_4F_9OC_2F_4H$ $HC_3F_6OCH_3$ $C_6F_{13}OCF_2H$ c-$C_6F_{11}CF_2OCF_2H$ $C_4F_9OCF_2C(CF_3)_2CF_2H$ $HCF_2CF_2OCF_2C(CF_3)_2CF_2OC_2F_4H$ $HCF_2O(C_2F_4O)_n(CF_2O)_mCF_2H$, wherein m = 0 to 2 and n = 0 to 3

$C_7F_{15}OCFHCF_3$ $HC_3F_6OC_3F_6H$ $C_5F_{11}OC_2F_4H$ $C_6F_{13}OC_2F_4OC_2F_4H$ $C_3F_7OCH_2F$ and The omega-hydrofluoroalkyl ethers described by Formula III can be prepared by decarboxylation of the corresponding precursor fluoroalkyl ether carboxylic acids and salts thereof or, preferably, the saponifiable alkyl esters thereof, as described in U.S. Pat. No. 5,658,962, which is herein incorporated by reference.

Alternatively, the omega-hydrofluoroalkyl ethers can be prepared by reduction of the corresponding omega-chlorofluoroalkyl ethers (for example, those omega-chlorofluoroalkyl ethers described in U.S. Pat. No. 5,785,950 and U.S. Pat. No. 5,403,575 (Flynn et al.), which is also described in U.S. Pat. No. 5,658,962.

The fluorochemical stabilizer should be soluble in the liquid or supercritical $CO_2$ from at least 0.01 weight percent to completely miscible. Preferably the fluorochemical stabilizer should be soluble in the liquid or supercritical $CO_2$ from at least 0.05 weight percent. The solubility of the stabilizer in $CO_2$ may be determined by charging a pressure vessel having a sight glass with liquid or supercritical $CO_2$, and adding a known amount of stabilizer and known amount of carbon dioxide. Generally, the fluorinated stabilizer of the present invention produce clear solutions (or microemulsions) and no interface between separate phases is observed. Less soluble materials will form a hazy solution or two separate phases will develop, and an interface between phases may be observed.

The fluorochemical stabilizer is generally used at concentrations from about 0.01 volume percent up to about 10 volume percent. Preferably, the stabilizer is used at concentrations from about 0.02 volume percent up to about 5 volume percent. For most applications due to cost considerations, the stabilizers are used in the minimum amounts necessary to produce a stable composition of compressed fluid $CO_2$ and inert gas.

The fluid composition of this invention is useful in both cleaning and extracting processes. The processes are similar since in a cleaning process an undesired component or contaminant is removed from a substrate, and in an extraction process, a desired component is separated from a substrate.

In the extraction processes of the invention, a substrate such as plant tissue is contacted with the fluid composition for a time sufficient to effect extraction of the desired substance, such an essential oil. Generally, the pressure and temperature of the process are chosen to optimally and preferentially extract the desired material while leaving intact the substrate and any undesired components of the substrate. The extraction process of this invention may be used, for example, to extract caffeine from whole or ground coffee, fats from animal or vegetable matter or other lipid containing materials, spice extracts from spices, nicotine from tobacco, pyrethrins from plant tissues, and residual solvents and monomers from polymers.

Advantageously, the fluid composition allows the relative proportions of compressed fluid $CO_2$, fluorochemical stabilizer and inert gas to be chosen to extract a desired component, such as caffeine from coffee, while not extracting other components, such as aromatic components and oils of the coffee. Pure compressed fluid $CO_2$ may be a relatively strong solvent for extraction of particular components, and typically, extraction of the desired component extracts other components due to non-selectivity of the $CO_2$. For example, in the extraction of caffeine from coffee, other components may also be extracted, such as flavor components, to the detriment of the decaffeinated coffee. The addition of an inert gas to the fluid composition, such as $N_2$ mitigates or reduces the solvent power of the fluid composition allowing a more selective extraction.

The proportion of $CO_2$ to inert gas is dependent on the component extracted and generally ranges from 25 to 99 weight percent $CO_2$ and from 1 to 75 weight percent inert gas. Where more aggressive extraction fluids are desired, the amount of $CO_2$ is preferably greater than 25% and more preferably greater than 50%. However, if it is desired to selectively extract a component from a substrate, the solvent power of the extraction fluid may be reduced by increasing the proportion of inert gas.

The operating pressures used in the extraction process will vary considerably, depending on the material to be extracted. Since the inert gas component of the fluid composition (nitrogen for example) has generally low critical temperatures, pressure is in the range of from about 2 to 70 MPa and preferably from about 2 to 25 MPa. The operating temperature of the extraction process will likely vary widely and may range from 0° C. to 200° C. and is preferably from 20° C. to 100° C. When extracting, it is desirable to select the pressure and temperature of the fluid, at a given fluid composition (relative amounts of $CO_2$ and inert gas), such that the fluid remains in the form of a microemulsion or solution. Physical states of the fluids, such as emulsions and foams, will have a deleterious effect on the efficiency of the extraction due to the increase viscosity and the decrease wetability of the fluid.

The process may further comprise a separation step whereby the fluid containing the extracted component is separated from the substrate, and further that the extracted component is separated from the extraction fluid and the extraction fluid recycled. The separation is often conveniently achieved by changing the pressure and/or temperature of the system. Normally, above the critical point of $CO_2$, a decrease in pressure will decrease the solubility of the extracted component. Normally, below the critical point of $CO_2$, a decrease in temperature will decrease the solubility of the extracted component. Thus, when operating above the critical point, the pressure may be reduced to decrease the solubility of the extracted component and facilitate separation, or, when operating below the critical point, a decrease in temperature will similarly facilitate separation.

Alternatively, the extraction fluid can be separated from contact with the substrate and the pressure released to at or near ambient pressure, resulting in evaporation of the gaseous components of the extraction fluid and deposition of the desired extracted component. Further, increasing the proportion of inert gas in the fluid composition will generally decrease the solubility of the extracted component in the extraction fluid resulting in selective precipitation.

If desired, small amounts of cosolvents may be added to the fluid composition to improve the solvent power of the composition or to selectively extract a desired compound. The cosolvents are generally less that about 10 weight percent of the fluid composition. Such cosolvents may include water, lower alcohols such methanol, ethanol or propanol, carboxylic acids and derivatives thereof (such as esters and amides), ketones, alkanes, alkenes, hydrochlorocarbons, hydrochlorofluorocarbons and hydrocarbon ethers. For example, the addition of small amounts of water greatly enhances the extraction of caffeine from coffee, or nicotine from tobacco. It is believed that the addition of water produces small amounts of carbonic acid in the fluid, which greatly facilitates the extraction of alkaloids such as nicotine and caffeine from the plant material substrates.

The fluid composition is also useful in a cleaning process whereby a substrate is contacted with the fluid composition for a time sufficient to remove an undesired component, such as a contaminant from a substrate. The process may further comprise the steps of separating the fluid composition containing the contaminant from the substrate and further separating the contaminant from the fluid composition.

The process may be used in numerous industrial and consumer applications. Examples include cleaning of metal substrates from metal forming and machining operations, cleaning of textiles, fabrics and garments such as in dry cleaning processes, cleaning of optical devices, electronic devices, and medical devices. Substrates useful in the present process include porous and nonporous solids such as metals, glass, ceramics, natural and synthetic polymers, and fabrics. Examples of contaminants that may be removed include organic contaminants such as greases, oils and waxes, inorganic salts, food stains, beverage stains such as coffee and wine, and water.

The fluid composition, when used in the cleaning process of the invention, may contain one or more cosolvents. The purpose of a cosolvent in the dry cleaning processes of the invention is to increase the oil solvency of the fluid composition. The cosolvent also enables the formation of a homogeneous solution or dispersion containing a cosolvent, the fluorochemical stabilizer, compressed fluid $CO_2$, inert gas, an oil contaminant and an optional detergent.

Useful cosolvents of the invention are soluble in the fluid composition, are compatible with typical dry cleaning detergents, and can solubilize oils typically found in stains on clothing, such as vegetable, mineral, or animal oils, and aqueous-based stains. Any cosolvent or mixtures of cosolvents meeting the above criteria may be used. Useful cosolvents include alcohols, ethers, glycol ethers, alkanes, alkenes, cycloalkanes, esters, ketones, aromatics, siloxanes, and hydrochlorocarbons,. Preferably, the cosolvent is selected from the group consisting of alcohols, alkanes, alkenes, cycloalkanes, esters, aromatics, and hydrochlorocarbons.

Either of the cleaning or extraction processes may be carried out by providing a substrate, containing a contaminant or extractable component, and placing the substrate in a suitable pressure vessel. The fluid composition may then be introduced to the vessel by separately adding the individual components ($CO_2$, inert gas, fluorochemical stabilizer, and cosolvents, if any) separately, simultaneously or as a blended mixture of two or more components of the fluid composition. The order of addition is not critical. The vessel may then be heated and further pressurized if desired.

The fluid composition, on contacting the substrate, removes the contaminant (or extractable component) from the substrate so that the contaminant is dissolved or dispersed in the fluid composition. It is preferably to agitate the vessel or substrate contained therein to enhance the removal of the contaminant (or extractable component). Agitation may be effected by any suitable means such as mechanical agitation, sonication, use of fluid jets, and the like. When cleaning, it is desirable to select the pressure and temperature of the fluid, at a given fluid composition (relative amounts of $CO_2$ and inert gas), such that the fluid remains in the form of a microemulsion of solution. Emulsion and foam forms of the fluids will have a deleterious effect on the efficiency of the extraction due to the increase viscosity and the decrease wetability of the fluid. Advantageously, a microemulsion or solution provides the benefit of lowering the viscosity of the fluid composition thereby enhancing intimate contact between the fluid and the substrate. The lower viscosity fluid is better able to penetrate into the voids and interstices of the substrate to remove contaminants (or extractable component) therefrom.

The fluid composition, containing the contaminant may then separated from the substrate by any suitable means such as venting or draining the fluid. The contaminant may then be separated from the fluid composition by varying the temperature and/or pressure of the fluid composition. Advantageously, the contaminant may be separated by increasing the proportion of inert gas in the fluid composition. Increasing the proportion of inert gas generally lowers the solvent power of the fluid composition resulting in phase separation or precipitation of the contaminant from the fluid composition. When sufficient additional inert gas in added to produce an emulsion or foam, these physical states are better able to disperse or suspend the contaminants.

EXAMPLES

The fluids of the present invention may be prepared in a pressure vessel such as an agitated stainless steel reactor, optionally equipped with high-pressure windows (e.g. sapphire) for observation of the cell contents and an additional pressure handling systems for the addition of various materials under high pressure conditions. The reactor may operate the processes described herein in a batch, semi-batch, or continuous mode. The reactor can be equipped with heating and/or cooling elements. If desired, the temperature can be monitored by a thermocouple device that can be connected to a temperature controller, which optionally can be microprocessor controlled. The reactor may also be fitted with a microprocessor process control unit. If desired, the reactor may be equipped with a venting mechanism to release pressure, or, optionally spray product out of the reactor. Preferably the reactor is equipped with a drain to allow removal of the fluid. In cleaning an extraction processes, a drain facilitates the separation of the fluid from the substrate and thereby reduces redeposition of the contaminant or extracted component.

All examples recorded below were performed in a 10 mL stainless steel view cell equipped with sapphire windows, a magnetic stirrer and, optionally, an additional pressure handling system to add various materials under high pressure. The cell was heated externally by either an electrical element or a coil containing temperature-controlled circulating oil. The temperature was monitored by a thermocouple connected to a temperature controller or temperature display unit.

Comparative Example 1

$CO_2$ and $N_2$ in the Absence of Fluorochemical Stabilizer

A 10 mL high pressure view cell, maintained at room temperature, was filled to about half volume with liquid carbon dioxide 8.5 MPa(~1200 psig). Nitrogen gas was bubbled into the cell at 11.9 Mpa (1690 psig) and the cell was shaken cell to facilitate mixing. There were two clear phases present with interface. The cell was heated and at 32° C. and about 12 Mpa (>1700 psig) the interface disappears, and one clear phase was observed.

Example 1

A 10 mL high pressure view cell was charged with 0.17 grams $C_4F_9OCH_3$ (prepared as described in Example 1 of U.S. Pat. No. 5,750,797). The cell was chilled in dry ice to −3° C., followed by addition of approximately 5 mL of $CO_2$. At −3° and 6.4 MPa (915 psig) the mixture was clear. Nitrogen gas was then bubbled into the cell. At 1° C. and 10.2 MPa (1475 psig), the contents of the cell remained clear. The cell was chilled to −21° C. and 7.6 MPa (1090 psig). The mixture remained clear with and one phase apparent.

Example 2

A 10 mL high pressure view cell at 21° C. was charged with 0.13 grams $C_4F_9OC_2H_5$ (prepared as described in Example 1 of U.S. Pat. No. 5,750,797, with diethyl sulfate). The cell was chilled in dry ice to −14° C. $CO_2$ was introduced to the cell, initially to produce 2.8 MPa (400 psig), then to 4.9 MPa (700 psig). The mixture was clear. Nitrogen gas was then bubbled into the cell, bringing the pressure to 11.8 MPa (1700 psig). The mixture remained clear with only a single phase.

Example 3

A 10 mL high pressure view cell at 2° C. was charged with 0.29 grams $C_4F_9OC_2H_5$. $CO_2$ was introduced to the cell to a pressure of 9.0 MPa (1300 psig). The liquid phase was clear. Nitrogen gas was then bubbled into the cell, bringing the pressure to 12.1 MPa (1740 psig) at 5° C. Initially, two clear liquid phases were observed. The cell was shaken, resulting in one clear liquid phase. The liquid remained clear as the cell was warmed to 11° C. More $N_2$ was bubbled in; resulting in two layers which became one clear phase upon mixing.

Example 4

A 10 mL high pressure view cell at 27° C. was charged with 0.1 mL $C_4F_9OC_2H_5$. $CO_2$ was introduced to the cell up to 6.5 MPa (925 psig). The $CO_2/C_4F_9OC_2H_5$ mixture was clear. Nitrogen gas was then bubbled into the cell, bringing the pressure to 11.3 MPa (1625 psig) at 26° C. Two cloudy liquid phases were observed with a clear gas headspace. On standing for a few minutes, there was only one liquid layer, which was cloudy. The cell was shaken. The liquid remained cloudy for more than 10 minutes. After 30 additional minutes, the liquid was clear, but became hazy with slight heating.

Example 5

A 10 mL high pressure view cell was charged with 0.11 grams $N(C_4F_9)_3$ (available as FC-43™ from the 3M Company, St. Paul, Minn.). $CO_2$ was introduced to the cell to produce a pressure of 7.7 MPa (1100 psig). The liquid phase was cloudy initially, but became clearer within a few minutes. The cell was chilled in dry ice to 12° C. The liquid phase ($CO_2+N(C_4F_9)_3$) was clear 6.1 MPa (870 psig). Continued cooling to −11° C. at 4.0 MPa (570 psig). Nitrogen gas was then bubbled into the cell, bringing the pressure to 11.0 MPa (1580 psig) at −6° C. The liquid phase becomes cloudy (dispersed $N_2$ in liquid $CO_2$) and remained cloudy upon cooling to −15° C. and 10.3 MPa (1480 psig). The cell was allowed to warm. At 7° C. and 12.4 MPa (1800 psig), a meniscus was no longer observed and the entire fluid composition appeared hazy. The appearance remained the same as the cell warmed to room temperature and 13.9 MPa (2000 psig).

Example 6

A 10 mL high pressure view cell was charged with 0.10 grams non-functional fluorinated polyethylene oxide having the structure $F_3CO(CF_2CF_2O)_nCF_3$ where n=6 to 12 (prepared as described in U.S. Pat. No. 5,488,142 (Guerra et al)). The cell was chilled in dry ice to 10° C. $CO_2$ was introduced to the cell to a pressure of 7.3 MPa (1040 psig). The perfluoropolyether dissolved immediately and the mixture was clear. The cell was cooled to −30° C. and 6.6 MPa (940 psig) and remained one clear phase. Nitrogen gas was then bubbled into the cell, bringing the pressure to 10.9 MPa (1575 psig). The mixture remained clear at −21° C. and 10.8 MPa (1560 psig). The cell was allowed to warm to room temperature and stand for two hours. The fluid remained clear.

Example 7

A 10 mL high pressure view cell at 12° C. was charged with 0.16 grams $C_3F_7OCH_3$ (prepared as described in Example 1 of U.S. Pat. No. 5,750,797, with perfluoropropionyl fluoride). The cell was chilled in dry ice to 9° C. $CO_2$ was introduced to the cell up to 7.7 MPa (1100 psig). The cell was about half full with clear liquid ($CO_2+C_3F_7OCH_3$). Additional $CO_2$ was added up to 9.6 MPa (1380 psig) at 7° C. Nitrogen gas was then bubbled into the cell, bringing the pressure to 10.1 MPa (1450 psig). The mixture remained clear.

Example 8

Control Extraction of Clean Needles

A 10 mL high pressure view cell at 11° C. was charged with 0.11 grams $C_4F_9OC_2H_5$. A bundle of stainless steel needles (each has 3.7 cm length×1 mm o.d.) tied with copper wire and weighing 10.15 grams was placed in the cell. $CO_2$ was introduced to the cell up to 6.9 MPa (990 psig) at 14° C. The cell was about half full with clear liquid ($CO_2+C_4F_9OC_2H_5$) almost covering the bundle. Nitrogen was added to the cell up to 11.9 MPa (1710 psig). Mixing currents were observed in the upper gas phase. The cell was heated slowly. At 20° C. (12.0 MPa; 1730 psig), a meniscus was no longer observed. Upon shaking the cell, mixing currents were again observed and the fluid appeared glassy. At 39° C. (14.1 MPa; 2031 psig), mixing currents were no longer observed and the fluid was clear. After one hour at these conditions, the cell was vented, and flushed once with $CO_2$. The bundle of needles was removed from the cell. The sample weight (10.15 grams) was unchanged from its original weight.

Example 9

Extraction of Needles Soaked in Mineral Oil

The bundle of needles from Example 8 (above) was soaked in mineral oil, then wiped to remove all oil external to the needle bores. The bundle weighed 10.35 grams. A 10 mL high pressure view cell at 34° C. was charged with 0.17 grams $C_4F_9OC_2H_5$. The oil soaked bundle of stainless steel needles was placed in the cell. $CO_2$ was introduced to the cell up to 6.7 MPa (960 psig). No interface was observed. Nitrogen was added to the cell up to 11.9 MPa (1715 psig). The fluid in the cell immediately became hazy, then cleared as liquid droplets of mineral oil were observed on the window of the view cell. The cell was heated to 39° C. and held for one hour (12.2 MPa; 1750 psig). The cell was vented and flushed with $CO_2$. Mineral oil, which had been extracted from the bundle, was redepositing on the cell and the bundle. The bundle of needles was removed from the cell. Excess mineral oil which had been redeposited on the external surface of the bundle during venting was wiped prior to weighing. The sample weight was now 10.24 grams (55 wt.% reduction of mineral oil in the first extraction).

The high pressure cell was cleaned to remove mineral oil residue, and the same bundle of needles was placed in the cell with 0.19 g $C_4F_9OC_2H_5$. $CO_2$ was added at 27° C. to 10.9 MPa (1570 psig). A few drops of mineral oil were observed on the window of the cell. Nitrogen was added to 12.4 MPa (1785 psig). The cell was heated to 39° C. (14.4 MPa; 2080 psig). The fluid in the cell was clear, with drops of mineral oil on the windows and sides of cell. After one hour, the cell was vented. Residual mineral oil droplets were again observed in the cell. The bundle was removed and weighed (10.21 grams). The mineral oil residue had now been reduced by 69% after two static extractions.

Dry Cleaning Examples

General Test Method

A laboratory scale test was used to evaluate the effectiveness of the fluid compositions in removing oil-based stains from fabrics. Two types of wool fabric were obtained from Burlington Fabrics (Clarksville, Va.)—a peach colored twill and a yellow crepe type fabric. These fabrics were cut into 3.50 inch by 2.25 inch (8.9×5.7 cm) swatches which were challenged with two oil-based stains. The oil-based stains consisted of 5 drops each of mineral oil (available as KAYDOL™ from Witco Chemical Co., Greenwich, Conn.); and corn oil (MAZOLA™, available from Best Foods CPC Intl., Inc., Englewood Cliffs, N.J.). The stains were each covered with a piece of wax paper, and a five pound weight was applied to each of the stains on the fabric for one minute to simulate grinding the stain into the garment. The weight and wax paper were then removed, and the stained fabric was exposed to ambient air for >20 minutes. The pieces of fabric were treated as described in the following examples:

Example 10

A yellow fabric sample was treated as described in the test method above. It was then folded and placed in a 10 mL high pressure view cell along with 0.26 grams $C_4F_9OCH_2CH_3$. The cell was charged with $CO_2$ to 8.0 MPa (1140 psig). Nitrogen gas was then bubbled into the cell, bringing the pressure to 12 MPa (1740 psig). The cell was shaken to mix the contents, causing the clear fluid phase to become hazy and mixing currents were observed. The cell was heated to 60° C. and the fluid phase again became clear. After 35 minutes, with the cell at 59° C. and 15.4 MPa (2220 psig), the cell was vented and the fabric removed. There were no oil stains apparent on the fabric.

Example 11

A peach fabric sample was treated as described in the test method above. It was then folded and placed in a 10 mL high pressure view cell along with 0.12 grams $C_4F_9OCH_3$. The cell was charged with $CO_2$ to 7.3 MPa (1050 psig). Nitrogen gas was then bubbled into the cell, bringing the pressure to 11.1 MPa (1600 psig). The cell was held at room temperature (24° C.). After 40 minutes, an oily residue was observed on the cell windows, and the fluid phase was clear. The cell was vented and the fabric removed. Fainter oil stains were still observed on the fabric.

Example 12

A peach fabric sample was treated as described in the test method above. It was then folded and placed in a 10 mL high pressure view cell along with 0.25 grams $C_4F_9OCH_2CH_3$. The cell was charged with $CO_2$ to 7.7 MPa (1110 psig). Nitrogen gas was then bubbled into the cell, bringing the pressure to 11.4 MPa (1640 psig). Haziness and mixing currents were observed. The cell was heated to 60° C. and 20 MPa (2900 psig), and the fluid phase appeared clear. After 1 hour, the cell was vented and the fabric removed. Oil droplets remained on the cell windows. There were no oil stains apparent on the fabric.

Example 13

Extraction of Coffee

A bundle of ground coffee was prepared by wrapping 0.40 g coffee grounds in cheesecloth and closed with a wire. The bundle was placed in a 10 mL high pressure view cell at 22° C. and charged with 0.53 grams water and 0.15 grams $C_4F_9OCH_2CH_3$. $CO_2$ was introduced to the cell to a pressure of 7.1 MPa (1010 psig). Nitrogen was added to the cell to a pressure of 12.5 MPa (1800 psig). The cell was heated to 60° C. The fluid in the cell surrounding the bundle appeared milky white, and became clear upon heating. After 10 minutes, the cell was at 59° C. and 15.5 MPa (2230 psig). After twenty minutes, tiny droplets of water were present on the cell window. After 70 minutes the droplets on window had coalesced. The cell was maintain at 73° C. and 16.6 MPa (2400 psig) for an additional hour for a total extraction time of two hours and 10 minutes. The cell was allowed to cool down while the contents of the cell was star ted were slowly vented through a series of two traps chilled in a dry ice/isopropanol bath and containing ethyl acetate to trap any caffeine venting with the $CO_2$. As the cell was vented, a liquid phase (meniscus) was again observed at 67° C. and 12.6 Mpa (1810 psig). A separate phase of liquid droplets (water) was still present on the window. Venting was complete after 25 minutes (cell was at 43 ° C.). The coffee bundle was removed from the cell (wt.=1.48 grams), the cell rinsed with ethyl acetate, and the rinse solution collected and saved for analysis. GC analysis confirmed the presence of caffeine in the ethyl acetate used to rinse the cell, indicating caffeine was extracted from the coffee.

What is claimed is:

1. A fluid composition comprising compressed fluid carbon dioxide, an inert gas, and a nonionic fluorochemical stabilizer soluble in said carbon dioxide, wherein the concentration of fluorochemical stabilizer in said fluid composition is from about 0.01 to 10 volume percent.

2. The fluid composition of claim 1, wherein said fluorochemical stabilizer is soluble from at least 0.01 wt. percent in said carbon dioxide.

3. The fluid composition of claim 1 wherein said fluorochemical stabilizer comprises a nonionic, linear or branched, cyclic or acyclic fluorinated hydrocarbon that optionally may contain one or more catenary nitrogen or oxygen heteroatoms.

4. The fluid composition of claim 3 wherein said fluorochemical stabilizer is perfluorinated.

5. The fluid composition of claim 4 wherein said fluorochemical stabilizer is selected from the group of linear or branched, cyclic or acyclic perfluoroalkanes, perfluoroethers, perfluoropolyethers and perfluoroamines.

6. The fluid composition of claim 3 wherein the number of fluorine atoms is equal to or greater than the number of hydrogen atoms of said fluorochemical stabilizer.

7. The fluid composition of claim 3 wherein said fluorochemical stabilizer comprises fluorinated ethers of the general formula:

$$(R_1\text{—}O)_n\text{—}R_2$$

wherein n is a number from 1 to 3 inclusive, $R_1$ and $R_2$ are the same or are different from one another and are selected from the group consisting of substituted and unsubstituted alkyl, aryl, and alkylaryl groups, wherein at least one of $R_1$ and $R_2$ contains at least one fluorine atom, and at least one of $R_1$ and $R_2$ contains at least one hydrogen atom.

8. The fluid composition of claim 3 wherein said fluorochemical stabilizer comprises fluorinated ethers of the general formula:

$$R_f\text{—}O\text{—}R$$

where $R_f$ and R are the same or are different from one another and are selected from the group consisting of substituted and unsubstituted alkyl, aryl, and alkylaryl groups, and wherein $R_f$ contains at least one fluorine atom, and R contains no fluorine atoms.

9. The fluid composition of claim 8 wherein $R_f$ is perfluorinated.

10. The fluid composition of claim 1 wherein the proportion of inert gas in said compressed fluid $CO_2$ is from about 1 to 75 weight %.

11. The composition of claim 1 wherein said carbon dioxide is in the supercritical state.

12. The composition of claim 1 wherein said composition is maintained at a pressure of 2 to 7.6 MPa.

13. The composition of claim 1 wherein said carbon dioxide is in the liquid state.

14. The composition of claim 1 wherein said fluid is a dispersion, foam, emulsion or microemulsion.

15. The composition of claim 4, wherein said fluorochemical stabilizer has from 3 to 20 carbon atoms.

16. The composition of claim 1, wherein said fluorochemical stabilizer has the formula $C_nF_{2n+2}$, where n is an integer of 3 to 20.

17. The composition of claim 1, wherein said fluorochemical stabilizer has the formula $C_nF_{2n+2}O_m$, where n is an integer of 3 to 20 and m is 1 to 5.

18. The composition of claim 1, wherein said fluorochemical stabilizer has the formula $C_nF_{2n+3}N$, where n is an integer of 3 to 20.

19. The composition of claim 1, wherein said fluorochemical stabilizer has the formula $C_nF_mH_{2n+2-m}$, where n is an integer of 3 to 20 and m is at least 1.

20. The composition of claim 1 wherein said inert gas is nitrogen.

21. The composition of claim 1 wherein the concentration of fluorochemical stabilizer in said fluid composition is from about 0.02 to 5 volume percent.

22. The composition of claim 1 wherein said composition is maintained at a pressure of 2 to 70 MPa.

23. A process for extraction of a desired component from a substrate comprising
(a) contacting a substrate with the fluid composition of claim 1 for a time sufficient to effect extraction of the desired component,
(b) separating said fluid composition containing said desired component from said substrate, and
(c) separating said desired component from said fluid composition.

24. The process of claim 23 wherein said fluid composition comprises 25 to 99 weight percent carbon dioxide.

25. The process of claim 23 wherein said fluid composition further comprises a cosolvent selected from the group consisting of water, lower alcohols, carboxylic acids, esters, amides, ketones, alkanes, hydrochlorocarbons, hydrochlorofluorocarbons and ethers.

26. The process of claim 23 wherein said composition is maintained at a pressure of 2 to 25 Mpa.

27. The process of claim 23 wherein said fluorochemical stabilizer of said fluid composition is selected from the group of linear or branched, cyclic or acyclic perfluoroalkanes, perfluoroethers, perfluoropolyethers and perfluoroamines.

28. The process of claim 27 wherein said fluorochemical stabilizer comprises fluorinated ethers of the general formula:

$$R_f\text{—}O\text{—}R$$

where $R_f$ and R are the same or are different from one another and are selected from the group consisting of substituted and unsubstituted alkyl, aryl, and alkylaryl groups, and wherein $R_f$ contains at least one fluorine atom, and R contains no fluorine atoms.

29. The process of claim 28 wherein $R_f$ is perfluorinated.

30. A process for cleaning of a contaminant from a substrate comprising
(a) contacting a substrate with the fluid composition of claim 1 for a time sufficient to remove or displace the contaminant from said substrate,
(b) separating said fluid composition containing said contaminant from said substrate, and
(c) separating said contaminant from said fluid composition.

31. The process of claim 30 wherein said substrate is selected from the group of metals, glass, ceramics, natural and synthetic polymers, and fabrics.

32. The process of claim 30 wherein said fluid composition further comprises a cosolvent selected from the group consisting of alcohols, ethers, glycol ethers, alkanes, alkenes, cycloalkanes, esters, ketones, aromatics, siloxanes, and hydrochlorocarbons.

33. The process of claim 30 wherein said fluorochemical stabilizer of said fluid composition is selected from the group of linear or branched, cyclic or acyclic perfluoroalkanes, perfluoroethers, perfluoropolyethers and perfluoroamines.

34. The process of claim 30 wherein said fluorochemical stabilizer comprises fluorinated ethers of the general formula:

$$R_f\text{—}O\text{—}R$$

where $R_f$ and R are the same or are different from one another and are selected from the group consisting of substituted and unsubstituted alkyl, aryl, and alkylaryl groups, and wherein $R_f$ contains at least one fluorine atom, and R contains no fluorine atoms.

35. The process of claim 34 wherein $R_f$ is perfluorinated.

* * * * *

UNITED STATES PATENT AND TRADEMARK OFFICE
CERTIFICATE OF CORRECTION

PATENT NO. : 6,235,701 B1　　　　　　　　　　　　　　　　　　　　　　Page 1 of 1
DATED : May 22, 2001
INVENTOR(S) : Elsbernd, Cheryl L. S.

It is certified that error appears in the above-identified patent and that said Letters Patent is hereby corrected as shown below:

Column 2,
Line 45, delete "Theological" and insert thereof -- rheological --.

Column 3,
Line 65, delete "#F atoms$\geq$ (#H atoms+#C—C bonds)." and insert thereof -- # F atoms $\geq$ (#H atoms + # C—C bonds). --.

Column 4,
Line 9, delete "$C_{nf2n+3}N$" and insert thereof -- $C_nF_{2n+3}N$ --.

Column 8,
Line 46, delete "nitrites" and insert thereof -- nitriles --.

Column 14,
Line 19, delete "$F_3CO(CF_2CF_2O)_{,n}CF_3$" and insert thereof -- $F_3CO(CF_2CF_2O)_nCF_3$ --.

Column 16,
Line 38, delete "star ted" and insert thereof -- started --.

Signed and Sealed this

Eighth Day of October, 2002

*Attest:*

*Attesting Officer*

JAMES E. ROGAN
*Director of the United States Patent and Trademark Office*